US009258266B2

(12) United States Patent
Nataraja et al.

(10) Patent No.: US 9,258,266 B2
(45) Date of Patent: Feb. 9, 2016

(54) HOST DETECTION BY TOP OF RACK SWITCH DEVICES IN DATA CENTER ENVIRONMENTS

(75) Inventors: Rajesh Nataraja, Sunnyvale, CA (US); Nilesh Shah, Fremont, CA (US); Shyam Kapadia, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 517 days.

(21) Appl. No.: 13/598,917

(22) Filed: Aug. 30, 2012

(65) Prior Publication Data

US 2014/0064104 A1 Mar. 6, 2014

(51) Int. Cl.

*H04L 12/24* (2006.01)
*H04L 29/12* (2006.01)
*H04L 12/755* (2013.01)

(52) U.S. Cl.

CPC ............. *H04L 61/103* (2013.01); *H04L 45/021* (2013.01); *H04L 61/6022* (2013.01)

(58) Field of Classification Search

CPC ........... H04J 3/14; H04L 43/50; H04L 12/66; H04L 65/00; H04L 2012/64; H04L 45/021; H04L 61/6022

USPC ...................... 370/60.1, 85.13, 248, 351, 401

See application file for complete search history.

(56) References Cited

U.S. PATENT DOCUMENTS 5,802,278 A * 9/1998 Isfeld et al. ................... 709/249
8,369,333 B2 * 2/2013 Hao et al. ...................... 370/392
2003/0223402 A1 * 12/2003 Sanchez et al. ............... 370/351
2010/0107162 A1 * 4/2010 Edwards et al. .................. 718/1
2010/0189117 A1 7/2010 Gowda et al.
2011/0103259 A1 * 5/2011 Aybay et al. .................. 370/254
2011/0138458 A1 6/2011 Kumar et al.
2011/0191469 A1 8/2011 Oran
2012/0317566 A1 * 12/2012 Santos et al. ...................... 718/1
2014/0198808 A1 * 7/2014 Zhou ............................ 370/475

OTHER PUBLICATIONS

International Search Report and Written Opinion in counterpart International Application No. PCT/US2013/054493, mailed Feb. 28, 2014, 15 pages.

Senevirathne et al., "ICMP based OAM Solution for TRILL", TRILL Working Group, Internet Draft, Standards Track, Jul. 7, 2012, pp. 1-110.

(Continued)

*Primary Examiner* — Mark Rinehart
*Assistant Examiner* — Natali N Pascual Peguero
(74) *Attorney, Agent, or Firm* — Edell, Shapiro & Finnan, LLC

(57) ABSTRACT

Techniques are provided for detecting and identifying host devices in a network. At a switch device, a packet is received from a server that is interfaced with a switch device and is configured to host a virtual machine that is a source of the packet. A Media Access Control (MAC) address or an Internet Protocol (IP) address is identified. The MAC address and IP address are associated with the virtual machine. In response to identifying the MAC or IP addresses, the switch device determines whether a binding between the IP and MAC addresses of the virtual machine is present in a database of addresses accessible by the switch device. If the association is not present, based on the fields obtained from the packet header, a request message is sent to the virtual machine to resolve the association between the IP address and the MAC address of the virtual machine.

22 Claims, 6 Drawing Sheets

(56) References Cited

OTHER PUBLICATIONS

Plummer, David, "An Ethernet Address Resolution Protocol or Converting Network Protocol Addresses to 48.bit Ethernet Address for Transmission on Ethernet Hardware", Network Working Group, Request for Comments: 826, Nov. 1, 1982, 11 Pages.

Finlayson et al., "A Reverse Address Resolution Protocol", Network Working Group, Request for Comments: 903, Jun. 1, 1984, 5 Pages.

Invitation to Pay Additional Fees and Partial International Search Report in counterpart International Application No. PCT/US2013/054493, mailed Dec. 17, 2013, 5 pages.

* cited by examiner

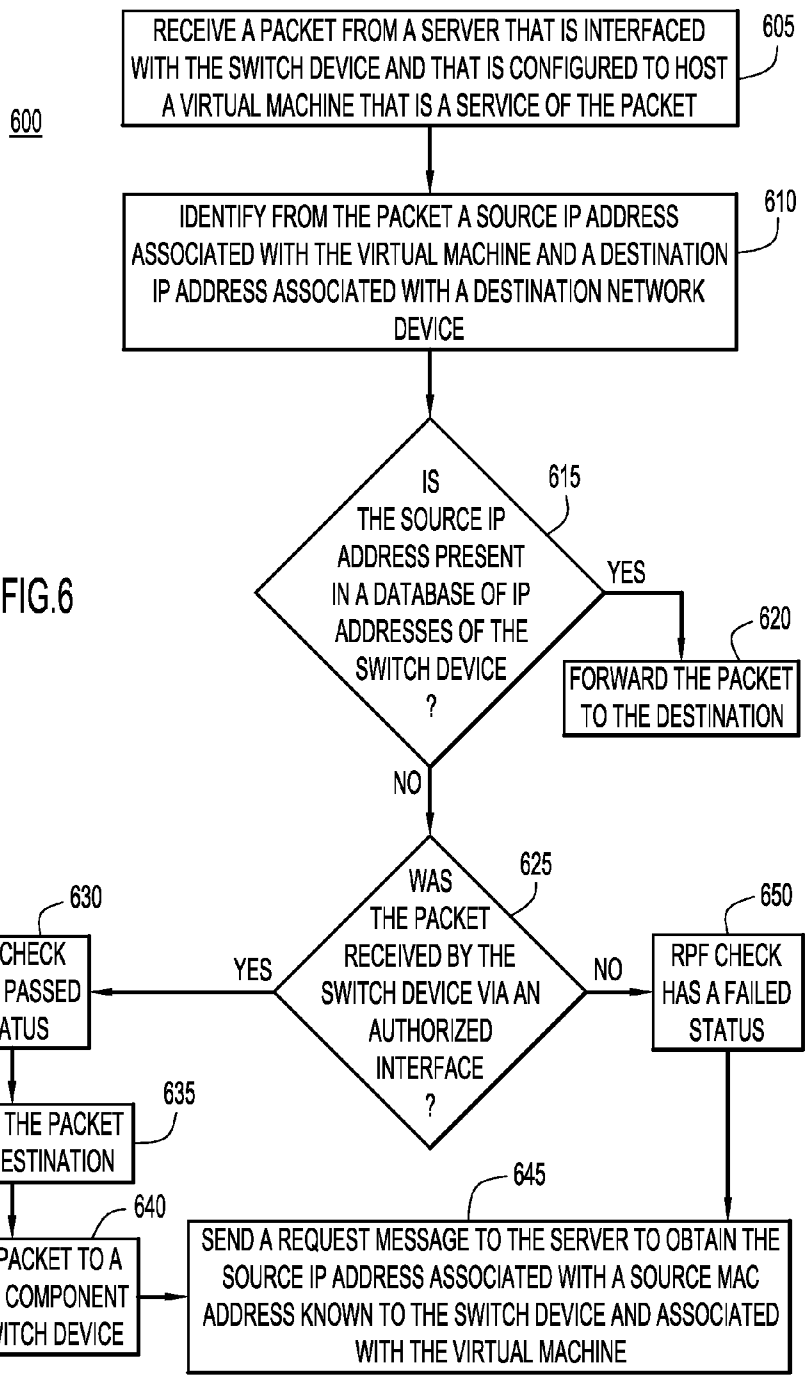
600
FIG.6
RECEIVE A PACKET FROM A SERVER THAT IS INTERFACED WITH THE SWITCH DEVICE AND THAT IS CONFIGURED TO HOST A VIRTUAL MACHINE THAT IS A SERVICE OF THE PACKET
605
IDENTIFY FROM THE PACKET A SOURCE IP ADDRESS ASSOCIATED WITH THE VIRTUAL MACHINE AND A DESTINATION IP ADDRESS ASSOCIATED WITH A DESTINATION NETWORK DEVICE
610
IS THE SOURCE IP ADDRESS PRESENT IN A DATABASE OF IP ADDRESSES OF THE SWITCH DEVICE ?
615
YES
FORWARD THE PACKET TO THE DESTINATION
620
NO
WAS THE PACKET RECEIVED BY THE SWITCH DEVICE VIA AN AUTHORIZED INTERFACE ?
625
YES
RPF CHECK HAS A PASSED STATUS
630
NO
RPF CHECK HAS A FAILED STATUS
650
FORWARD THE PACKET TO THE DESTINATION
635
LEAK THE PACKET TO A SOFTWARE COMPONENT OF THE SWITCH DEVICE
640
SEND A REQUEST MESSAGE TO THE SERVER TO OBTAIN THE SOURCE IP ADDRESS ASSOCIATED WITH A SOURCE MAC ADDRESS KNOWN TO THE SWITCH DEVICE AND ASSOCIATED WITH THE VIRTUAL MACHINE
645

HOST DETECTION BY TOP OF RACK SWITCH DEVICES IN DATA CENTER ENVIRONMENTS

TECHNICAL FIELD

The present disclosure relates to detecting host servers in a network environment.

BACKGROUND

Physical servers in a network may be located in a rack unit that houses a plurality of servers. The physical servers within a rack unit may be managed by a top of rack (ToR) switch that routes communications between the servers and to other external network elements. Additionally, the physical servers may be configured to host one or more virtual machines that may be arranged in one or more virtual networks or subnets. Upon joining the network, the virtual machines are assigned context identifiers, such as an Internet Protocol (IP) address, Media Access Control (MAC) address and subnet assignment. These context identifiers are used for communications between virtual machines.

BRIEF DESCRIPTION OF THE DRAWINGS

FIG. 6 shows an example flow chart depicting operations performed by the switch device to determine the identity of the virtual machine in response to a reverse path forwarding (RPF) check performed by the switch device.

DESCRIPTION OF EXAMPLE EMBODIMENTS

Overview

Figure 1:
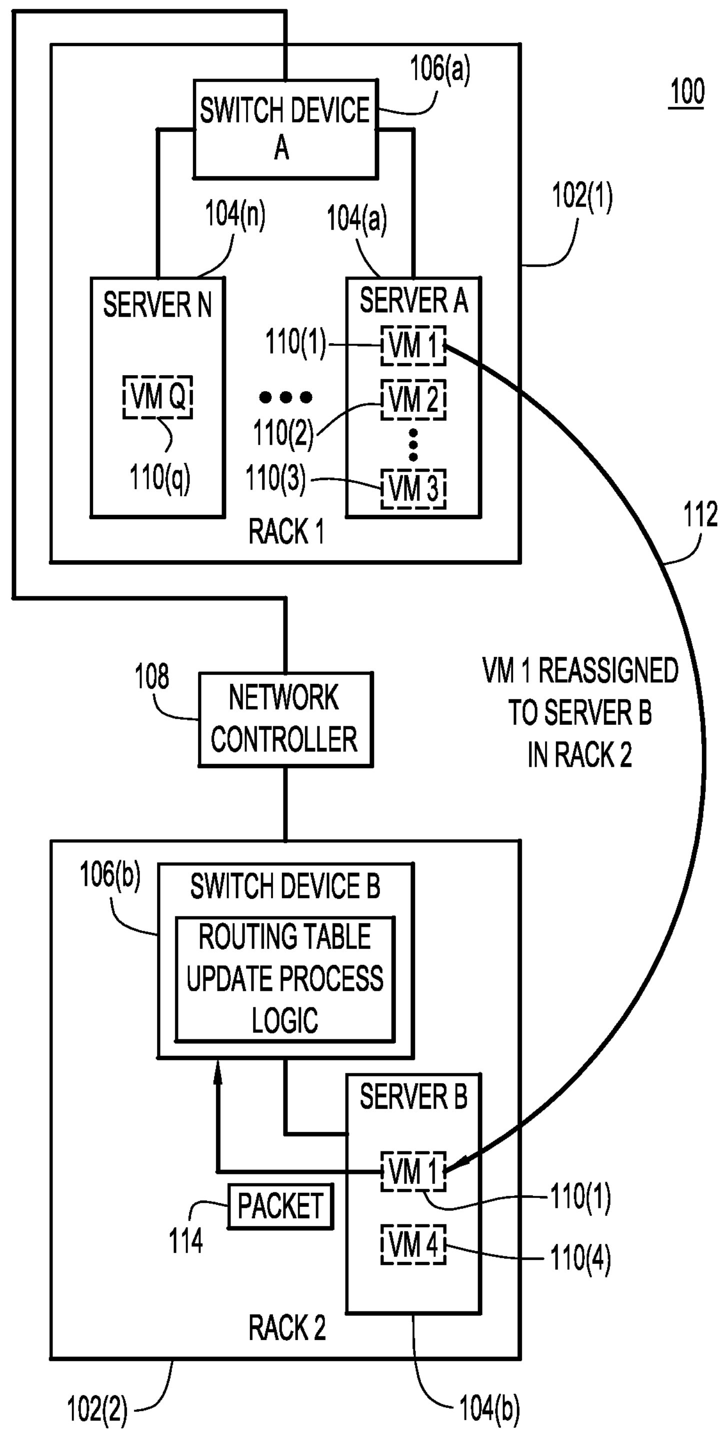
FIG. 1 shows an example system or network topology including a plurality of rack units, each of which has a switch device that is configured to detect virtual machines that are hosted by physical servers in the rack units.

Techniques are provided for detecting and identifying host devices in a network. These techniques may be embodied as a method, apparatus and instructions in a computer-readable storage media to perform the method. At a switch device, a packet is received from a server that is interfaced with the switch device and that is configured to host a virtual machine that is a source of the packet. A Media Access Control (MAC) address is identified from the packet. The MAC address is associated with the virtual machine. In response to identifying the MAC address, the switch device determines whether an Internet Protocol (IP) address corresponding to the MAC address of the virtual machine is present in a database of IP addresses and MAC addresses accessible by the switch device. If the determining indicates that the IP address corresponding to the MAC address is not present in the database, a request message is sent to the virtual machine hosted by the server to obtain the IP address associated with the MAC address of the virtual machine.

Additionally, the switch device may receive a packet from a server that is interfaced with the switch device and that is configured to host a virtual machine that is a source of the packet. The switch device identifies from the packet a source IP address associated with the virtual machine and a destination IP address associated with a destination network device. The switch device determines that the source IP address is not present in a database of IP addresses of the switch device and evaluates the database to determine whether or not the packet was received by the switch device via an authorized interface. When the evaluating indicates that the packet was received by the switch device along an authorized interface, a request message is sent to the server to obtain the source IP address associated with a source MAC address known to the switch device and associated with the virtual machine.

Example Embodiments

The techniques described hereinafter involve detecting and identifying network devices and virtual machines in a network. An example network system/topology (hereinafter "network") is shown at reference numeral 100 in FIG. 1. The network 100 comprises a plurality of rack units ("racks"), shown at reference numerals 102(1) and 102(2). The rack units 102(1) and 102(2) may also be referred to as "rack 1" and "rack 2," respectively. Each of the rack units 102(1) and 102(2) has one or more servers units ("servers"), shown at reference numerals 104(*a*)-104(*n*). Server unit 104(*a*) may be referred to as "server A," server unit 104(*b*) may be referred to as "server B," and so on.

Each rack unit also has a switch device ("switch" or "top of rack switch"), shown at reference numerals 106(*a*) and 106(*b*). The switches 106(*a*) and 106(*b*) may also be referred to as "switch device A"/"switch A" and "switch device B"/"switch B," respectively. The switches 106(*a*) and 106(*b*) are configured to manage communications within a rack unit and also to communicate with switches residing in other rack units. Additionally, the switches 106(*a*) and 106(*b*) are configured to communicate with a network controller unit ("network controller"), shown at reference numeral 108. For example, switch device A is configured to manage communications from server A and server 104(*n*) ("server N") and is also configured to communicate with switch B via the network controller 108. It should be appreciated that the topology in FIG. 1 is shown merely as an example, and any number of racks, servers, switches and network controllers may be present in network 100.

The servers 104(*a*)-104(*n*) are physical servers configured to exchange data communications with each other in the network 100. Each of the servers 104(*a*)-104(*n*) may be configured to host one or more "virtual" machines ("VMs"). These virtual machines are shown at reference numerals 110(1)-110(*q*). Virtual machine 110(1) may be referred to as "virtual machine 1" or "VM 1," virtual machine 110(2) may be referred to as "virtual machine 2" or "VM 2," and so on. The servers 104(*a*)-104(*n*) may host the virtual machines on hardware or software components. Additionally, the virtual machines 110(1)-110(*q*) may reside in one or more virtual networks or subnets. For example, the virtual machines 110(1)-110(*q*) may be assigned to one or more virtual local area networks (VLANs), and a virtual machine that is hosted on one server may be a part of a same or different virtual network as virtual machines that are hosted on another server.

Switch device A and switch device B may be layer 2 network switch devices as defined by the Open Systems Interconnection (OSI) model. As layer 2 switch devices, switch device A and switch device B are configured to use Media Access Control (MAC) address information associated with network devices (e.g., the servers 104(*a*)-104(*n*) and/or the virtual machines 110(1)-110(*q*)) to forward data communications (e.g., packets) between source and destination devices. Additionally, as described hereinafter, the switch devices 106(*a*) and 106(*b*) can perform MAC address learning operations to identify MAC addresses of hosts (e.g., the servers 104(*a*)-104(*n*) and/or the virtual machines 110(1)-110(*q*)) exchanging data communications with each other via the switch devices. For example, switch device A can receive a packet from VM 2, hosted by server A, that is destined for VM Q, hosted by server N. Upon receiving the packet, switch device A can learn the MAC address of VM 2 and can utilize information in the packet to learn the MAC address of VM Q, as described hereinafter. Additionally, in this example, switch device A can learn the MAC address associated with server A that hosts VM 2 and the MAC address associated with server N that hosts VM Q.

Upon initially "signing on" or joining the network 100, each of the virtual machines 110(1)-110(*q*) is assigned context identifiers. For example, the virtual machines 110(1)-110(*q*) are assigned context identifiers that may include an Internet Protocol (IP) address (e.g., an IP version 4 (IPv4) or IP version 6 (IPv6) address), a MAC address, a port number associated with a VLAN of the virtual machine, etc. The context identifiers may be assigned to the virtual machines 110(1)-110(*q*) using, for example, a dynamic host configuration protocol (DHCP).

As stated above, switch device A and switch device B can identify or "learn" the MAC address associated with the virtual machines 110(1)-110(*q*). For example, if VM 2 is attempting to communicate with VM Q, VM 2 will send a packet to switch device A for ultimate transmission to VM Q. This packet will comprise, among other things, a source MAC address identifying the MAC address of VM 2 and a destination address identifying the MAC address of VM Q. Switch device A receives this packet on a first port located on switch device A. For example, this first port may be a physical port associated with server A (which hosts VM 2), and this physical port may be mapped to a plurality of virtual ports associated with the virtual machines hosted by server A. Switch device A evaluates the packet to determine the source MAC address and the destination MAC address. The source MAC address and the port on which the packet was received is stored in a database ("routing table database" or "routing table") of switch device A.

If the destination MAC address is not already stored in the routing table of switch device A, switch device A will send a broadcast message or frame across all of its ports, except the port on which the packet was received. Thus, all the virtual machines except VM 2 (the source of the packet) receive the broadcast frame. The switch device A then receives a reply to the broadcast frame only from the destination device (i.e., VM Q) on a second port. As described above, this second port may also be a physical port associated with server B (which hosts VM Q), and this physical port may be mapped to a plurality of virtual ports associated with virtual machines hosted by server N. Upon receiving the reply to the broadcast frame, the MAC address of the source of the reply to the broadcast frame (e.g., the MAC address of VM Q, since VM Q was the destination of the original packet and thus the source of the reply) and the port on which the reply packet was receive is stored in the routing table of switch device A. Thus, switch device A "learns" both the source MAC address associated with VM 2 and the destination MAC address associated with VM Q by receiving messages from both VM 2 and VM Q (e.g., the original packet and the reply to the broadcast frame, respectively). Switch device A, however, cannot use this "learning" technique to identify the IP addresses associated with the virtual machines.

Often times, virtual machines may migrate or be reassigned to different host servers based on the characteristics of the network 100. As shown at reference numeral 112 in FIG. 1, VM 1 may migrate from server A to server B, for example, based on the processing capabilities of server A and/or server B, even though server A and server B are located in different racks (e.g. that are physically separated). That is, though VM 1 is initially assigned to server A, server A may later have reduced processing bandwidth and/or server B may have increased processing bandwidth. As a result, it may be more operationally efficient for server B to host VM 1 on rack 2 instead of server A hosting VM 1 on rack 1. A server administration unit or server administrator entity (not shown in FIG. 1) may reassign VM 1 from being hosted on server A to being hosted on server B. The server administrator unit, however, cannot pass this reassignment information to a network administrator unit or network administrator entity (also not shown in FIG. 1) that is responsible for managing communications in the network 100. Thus, the network administrator unit does not obtain the reassignment information, and the devices in the network must "discover" or "learn" this reassignment on their own. It should be appreciated that any of the virtual machines 110(1)-110(*q*) may be reassigned to any other server in the network 100.

When a virtual machine migrates to a new server, the virtual machine retains the original context identifier information that was assigned to it. That is, in FIG. 1, when VM 1 migrates from server A to server B, VM 1 still retains context information (e.g., the IP address, and MAC address) that was originally assigned to it when VM 1 joined the network 100. However, when VM 1 migrates to server B, switch device B, which manages server B, may not have access to this context identifier information, though switch device B can still learn the MAC address of VM 1 by performing the MAC address learning techniques described above.

As stated above, switch device A and switch device B can utilize techniques to learn the MAC address of virtual machines. However, switch device A and switch device B cannot use these techniques to learn the IP addresses of the virtual machines. In one example, after migrating to server B, VM 1 may later attempt to send a data packet, shown at reference numeral 114, to another virtual machine in the network 100. Switch device B cannot simply evaluate the packet itself to obtain the IP address associated with VM 1, since switch device B is a layer 2 switch device. Additionally, the IP address information in the packet itself may be a spoofed or fake IP address, and thus, switch device B must authenticate the IP address independently. Since the IP address of the source and destination virtual machines in the network 100 are not stored in the routing table of switch device B (since switch device B has not "learned" these IP addresses), switch device B may drop the packet 114, resulting in delayed or interrupted communications between VM 1 and the destination virtual machine. Thus, in order to avoid delayed or interrupted communications, switch device B is configured to identify the IP addresses of the source and destination virtual machines and further configured to map these IP addresses to the known MAC addresses of the virtual machines. Techniques for this obtaining this MAC-to-IP mapping information are described hereinafter.

Figure 2:
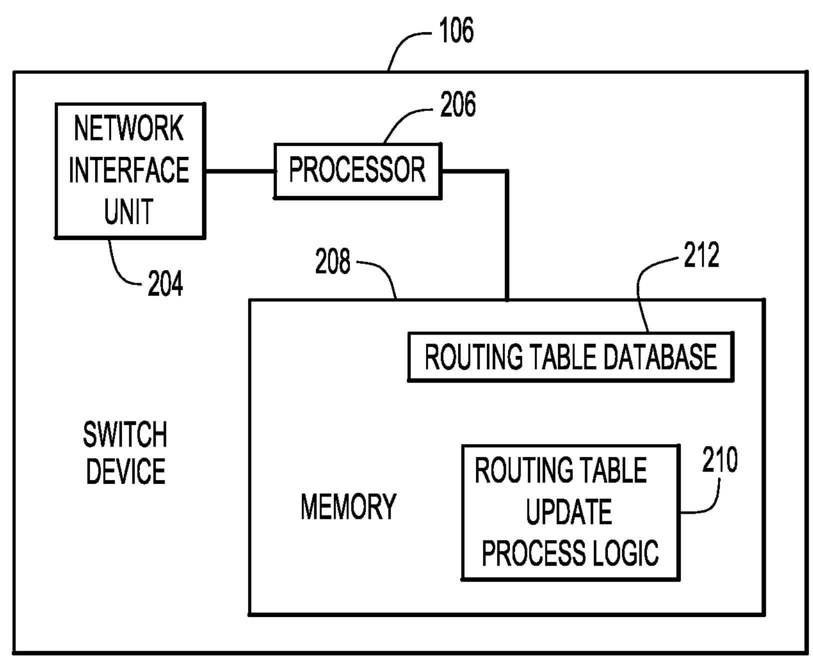
FIG. 2 shows an example block diagram of the switch device configured with routing table update process logic to map Internet Protocol (IP) addresses with Media Access Control (MAC) addresses associated with the virtual machines.

Reference is now made to FIG. 2. FIG. 2 shows an example block diagram of a switch device. For simplicity, the switch device in FIG. 2 is shown at reference numeral 106, though it should be appreciated that the switch device 106 may be any of the switch devices in the network 100. The switch device 106 comprises, among other components, a network interface unit 204, a processor 206 and a memory 208. The network interface unit 204 is configured to receive communications (e.g., packets) from devices in the network 100 and is configured to send communications to devices the network 100. For example, the network interface unit 204 is configured to send and receive data packets from the servers and from the network controller 108. The network interface unit 204 is coupled to the processor 206. The processor 206 is, for example, a microprocessor or microcontroller that is configured to execute program logic instructions (i.e., software) for carrying out various operations and tasks of the switch device 106, as described herein. For example, the processor 206 is configured to execute routing table update process logic 210 to update a routing table database 212 with context identifier information of newly migrated virtual machines. The functions of the processor 206 may be implemented by logic encoded in one or more tangible computer readable storage media or devices (e.g., storage devices compact discs, digital video discs, flash memory drives, etc. and embedded logic such as an application specific integrated circuit, digital signal processor instructions, software that is executed by a processor, etc.).

The memory 208 may comprise read only memory (ROM), random access memory (RAM), magnetic disk storage media devices, optical storage media devices, flash memory devices, electrical, optical, or other physical/tangible (non-transitory) memory storage devices. The memory 208 stores software instructions for the routing table update process logic 210. The memory 208 also stores the routing table database 212 that, as described above, stores context identifier information for virtual machines hosted by servers managed by the switch device 106. Thus, in general, the memory 208 may comprise one or more computer readable storage media (e.g., a memory storage device) encoded with software comprising computer executable instructions and when the software is executed (e.g., by the processor 206) it is operable to perform the operations described for the routing table update process logic 210.

The routing table update process logic 210 may take any of a variety of forms, so as to be encoded in one or more tangible computer readable memory media or storage device for execution, such as fixed logic or programmable logic (e.g., software/computer instructions executed by a processor), and the processor 206 may be an application specific integrated circuit (ASIC) that comprises fixed digital logic, or a combination thereof.

For example, the processor 206 may be embodied by digital logic gates in a fixed or programmable digital logic integrated circuit, which digital logic gates are configured to perform the routing table update process logic 210. In general, the routing table process logic 210 may be embodied in one or more computer readable storage media encoded with software comprising computer executable instructions and when the software is executed operable to perform the operations described hereinafter.

In general, as stated above in connection with FIG. 1, VM 1 may migrate from server A on rack 1 to server B on rack 2. When VM 1 migrates to server B, it retains its context identifier information, but switch device B, which manages server B, may not have this context identifier information stored in its routing table. Thus, if VM 1 attempts to send a data packet to another virtual machine in the network 100, switch device B may receive the packet from VM 1, but may not be able to identify the source of the packet (since it does not have the source identifier information associated with VM 1 in its routing table). For example, the data packet may list the IP address of VM 1 as the source IP address, and upon receipt of the data packet from VM 1, switch device B may not recognize this source IP address. Accordingly, switch device B may drop the packet, thus causing unwanted delays and disruptions in network communications between VM 1 and the destination virtual machine. In order to prevent such delays and disruptions, switch device B is configured to update its routing table to include the context identifier information of VM 1.

An existing solution for updating the routing table of switch device B involves VM 1 sending a message to switch device B announcing its presence on server B. One such message is a gratuitous address resolution protocol (ARP) or GARP message to switch device B. The GARP message includes the context identifier information of VM 1 and allows switch device B to map the MAC address associated with VM 1 to the IP address associated with VM 1. This solution, however, may not be optimal. For example, VM 1 may not always send a GARP message to switch device B, and even if VM 1 does send a GARP message, switch device B may be subject to network policies that prevent switch device B from accepting the GARP message (e.g., the network policies related to control-plane policing for protection for a central processing unit (CPU) may result in GARP messages being dropped). Thus, switch device B may drop the GARP message without updating its routing table, and as a result, switch device B will not update its routing table to include the IP address of VM 1. Other techniques, such as using a dynamic host configuration protocol (DHCP) message between VM 1 and switch device B also may not be useful, since VM 1 retains its context identifier information and is not assigned new context identifier information upon migration to server B. Thus, improved techniques for updating the routing table of switch device B are desired.

When VM 1 migrates from server A to server B, switch device B is able to learn the MAC address associated with the migrated virtual machine using the traditional MAC address learning techniques described above. For example, after VM 1 migrates to server B, VM 1 may send packet 114 to switch device B for ultimate transmission to a destination virtual machine. In the course of receiving the packet 114, switch device B can store the MAC address (listed as the source MAC address in the packet 114) and the port on which the packet 114 was received in order to identify VM 1. As stated above, however, switch device B cannot determine the IP address associated with VM 1 by using only these learning techniques. Instead, switch device B can obtain the IP address associated with VM 1 by, for example, triggering a request message to be sent to VM 1 that instructs VM 1 to send its IP address information to switch device B. This request message is typically called a reverse ARP (e.g., "RARE" or "ARP request message"). In response to receiving the request message, VM 1 will send a response message (e.g., an ARP response message) that contains the IP address associated with VM 1. In particular, these techniques allow switch device B to obtain the IP address associated with VM 1 with confidence that the IP address information is accurate (e.g., not spoofed) by triggering the ARP request message and receiving the ARP response message. Thus, the techniques described hereinafter involve various techniques for triggering switch device B to send a request message (e.g., the ARP request message) to VM 1, and in response, for VM 1 to send a response message (e.g., the ARP response message) containing the IP address information to switch device B. In one example, the switch device B may send the ARP request message to VM 1 in response to not having received or having stored/processed a GARP message from VM 1 (e.g., if the GARP message from VM 1 to the switch device B was dropped, lost or discarded by the switch device B). These techniques allow switch device B to obtain the IP address associated with VM 1. It should be appreciated that these techniques may be used to obtain the IP address of any network device by any switch device in the network 100.

Figure 3:
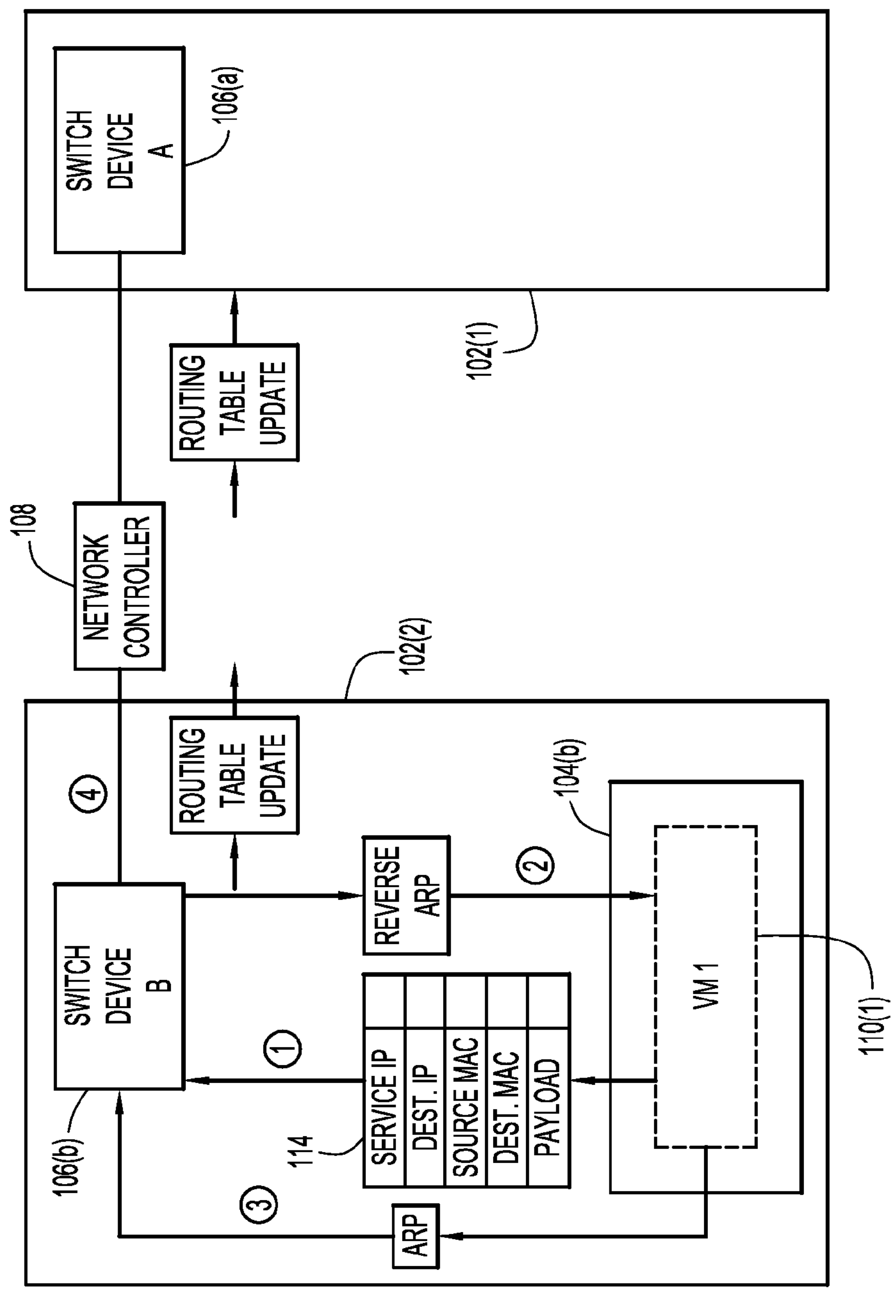
FIG. 3 shows an example topology depicting exchanges between the switch device and the virtual machine to update a routing table of the switch device.

One embodiment of the techniques to trigger the switch device B to send the ARP request message is shown in FIG. 3. Specifically, FIG. 3 shows an example of exchanges between VM 1 and switch device B to update the routing table of switch device B. In FIG. 3, as shown at reference point 1, VM 1 sends the packet 114 from server B (on which VM 1 is hosted) to switch device B. The packet 114 may be a data packet (e.g., an IP packet) containing a source IP address and a source MAC address to identify VM 1 as the source of the packet 114. The packet 114 may also contain a destination IP address and a destination MAC address to identify the destination virtual machine for the packet 114. The packet 114 also contains a payload.

Upon receiving the packet 114, the switch device B is able to learn the MAC address associated with VM 1, utilizing, for example, the layer 2 MAC address learning techniques described above. In order to learn the IP address associated with VM 1, however, the switch device B must utilize techniques to map or bind the MAC address associated with VM 1 with IP address information associated with VM 1. This mapping or binding is called "MAC-to-IP mapping" or "MAC-to-IP binding." In general, the mapping of MAC addresses and IP addresses provides an association between the MAC address and IP address of a corresponding virtual machine.

When switch device B receives the packet 114, it first identifies the MAC address from the packet 114 and then accesses its routing table to determine whether or not there is an IP address mapped to that MAC address associated with VM 1. If there is a "MAC-to-IP mapping" already present in the routing table, the switch device B simply forwards the packet in the network to the appropriate destination device. If, however, there is not a "MAC-to-IP binding" entry in the routing table for the MAC address associated with VM 1, the switch device B sends a message back to VM 1 along the port on which the packet 114 was received, as shown at reference numeral 2. This message is a request message for VM 1 to send its IP address information to switch device B. In one example, the request message may be the reverse ARP message. Thus, the lack of MAC-to-IP binding information in the routing table triggers the switch device B to send the ARP request message to VM 1. In other words, upon receiving the packet 114, switch device B uses the source MAC address in the packet 114 as a "key" to look for the IP address associated with the MAC address in the routing table and to obtain the IP address from VM 1 by sending the request message to VM 1 if the IP address is not in the routing table. After receiving the request message from switch device B, VM 1 then sends a response message to switch device B, as shown at reference numeral 3. The response message contains the IP address associated with VM 1. In one example, the response message may be the ARP response message, described above.

Upon receiving the response message from VM 1, switch device B can update its routing table to include the MAC-to-IP mapping for VM 1. That is, switch device B maps the IP address contained in the ARP response message to the MAC address it previously learned for VM 1. Switch device B can then send a routing table update to other switch devices in the network (e.g., switch device A) via the network controller 108, as shown at reference numeral 4. Thus, after switch device B has performed the MAC-to-IP mapping for VM 1, switch device B can distribute this mapping information to all of the other switch devices in the network 100 by sending the routing table update shown at reference numeral 4.

It should be appreciated that there may be situations where the switch device B already has the MAC-to-IP mapping information for VM 1. For example, switch device A may have previously mapped the MAC address of VM 1 to the IP address of VM 1, and may have sent a routing table update to switch device B informing switch device B of this mapping. In this scenario, switch device B would not need to send the request message to VM 1, as switch device B, upon receiving the packet 114, would determine that it already has the MAC-to-IP mapping information in its routing table via the routing table update received from switch device A. As stated above, virtual machines always retain the same MAC address and IP address as they migrate within the network 100, and thus, once the MAC-to-IP mapping information is determined by any switch device and is distributed within the network 100, the MAC-to-IP mapping information remains accurate, even as the virtual machines migrate within the network 100.

The techniques described hereinafter provide another embodiment for triggering switch device B to send an ARP request message to VM 1. In this next embodiment, after VM 1 migrates to server B, switch device B can evaluate an interface on which the packet 114 is received in order to determine the IP address associated with VM 1. As described above, when VM 1 first joins the network 100, it is assigned context identifier information and may also be assigned to a virtual network or subnet. For simplicity, this subnet is referred to hereinafter as VLAN 100. As such, the switch devices in the network 100 may be provisioned to manage communications within VLAN 100 by sending and receiving communications via interfaces (e.g., ports) that service VLAN 100. For example, switch device A and switch device B may be provisioned to send and receive communications in VLAN 100 via its ports (physical and/or virtual ports).

After VM 1 migrates to server B, VM 1 may send the packet 114 to switch device B to initiate a communication with another virtual machine in VLAN 100. Switch device B, as described above, is provisioned to service communications in VLAN 100, via one or more ports, and packet 114 is received by switch device B via one of these ports. Upon receiving the packet 114, switch device B determines whether or not the source IP address associated with VM 1 exists in its hardware routing table referred to as the reverse path forwarding (RPF) test. If the source IP address associated with VM 1 exists in its routing table, switch device B forwards the packet out of the appropriate port to the device associated with the destination IP address. If, however, the source IP address associated with VM 1 does not exist in its routing table, switch device B then handles the packet as mentioned below.

Traditionally, an RPF failure indicates that the source IP address of an incoming packet was received along an interface that is not one of the valid outgoing interfaces along which packets destined towards the source IP address are forwarded. Thus, as a result of the RPF failure, switch device B will send an ARP request to the source of the packet in order to obtain the IP address associated with the source of the packet.

In the present example, however, when VM 1 sends packet 114 to switch device B, switch device B receives the packet along a known interface, even though the source of the packet (e.g., the IP address of VM 1) is unknown to switch device B. In other words, though the identity of VM 1 (the IP address) may not be known to switch device B, switch device B knows that the packet 114 was received along a known or authorized interface, since switch device B is configured to service communications in the subnet of VM 1 (VLAN 100). Thus, since the packet is received along a known interface in VLAN 100, switch device B determines that the RPF check has passed, even though the IP address of VM 1 is unknown.

Under traditional RPF techniques, since switch device B determines that the RPF check has passed in hardware, consequently, software on switch device B would not send an ARP request message to VM 1. Switch device B, instead, would simply forward the packet 114 out of the appropriate port of the switch device. However, in this embodiment, as a result of the RPF pass, switch device B still forwards the packet 114, but additionally, switch device B also leaks the packet 114 to a software component of the switch device B. Leaking the packet 114 to the software component of the switch device B triggers switch device B to send an ARP request message to VM 1 to obtain the IP address of VM 1. As a result, VM 1 responds to the ARP request message by sending an ARP response message containing the source IP address of VM 1 to switch device B. Thus, switch device B can obtain the MAC-to-IP mapping by receiving the IP address of VM 1 in the ARP response message. In one example, packets are leaked to the software only periodically (e.g., every five packets) so as not to overwhelm the processing capabilities of switch device B. This method ensures that an ARP request message will be triggered (periodically) when packets are received with unknown source IP addresses, even if the packets are received along known interfaces.

In another example of this embodiment, though switch device B determines that the RPF check has passed, switch device B can modify the RPF check result to indicate an RPF failure (e.g., switch device B can "hack" the RPF check to return an RPF failure, even though the initial RPF check has passed). This technique can be used to redirect such packets to the software component, as described above. That is, even though the packet 114 was received along a known interface, since the source IP address is still unknown, switch device B can modify the RPF check to return an RPF check failure when it would have otherwise returned an RPF pass. This technique may be useful, for example, when switch device B does not have the capability to leak packets to the software while also forwarding the packets. As described above, this RPF failure status results in switch device B sending an ARP request to VM 1 to obtain the IP address associated with VM 1. VM 1 responds with an ARP response message containing its IP address information. Thus, switch device B can obtain the MAC-to-IP mapping by receiving the IP address of VM 1 in the ARP response message.

Figures 4A, 4B:
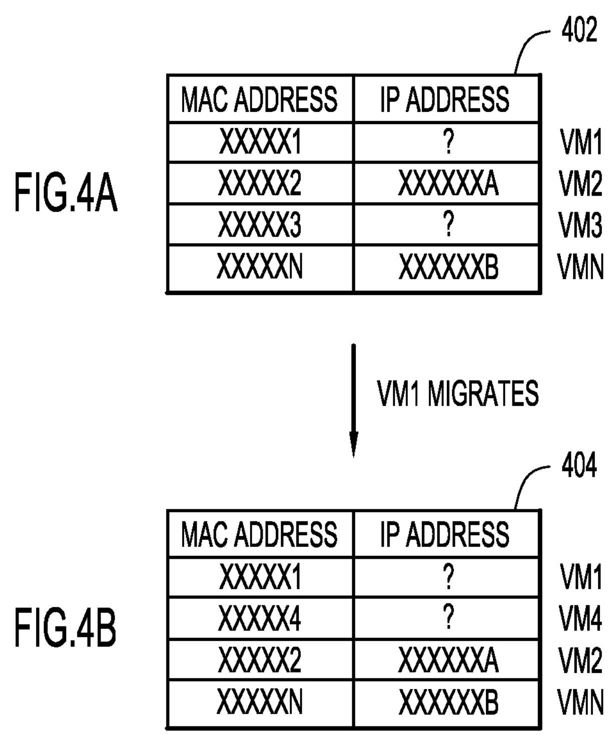
FIGS. 4A and 4B show examples of data stored in the routing table maintained by switch devices.

Reference is now made to FIGS. 4A and 4B. FIGS. 4A and 4B show examples of data that is stored in routing tables of switch device A and switch device B, respectively. Data 402 in FIG. 4A shows the routing table of switch device A, which has the MAC addresses of VM 1, VM 2, VM 3 and VM N. Additionally, the routing table of switch device A also has MAC-to-IP binding information for VM 2 and VM N, obtained, for example, by one or more of the techniques described above for communications between VM 2 and VM N.

Data 404 in FIG. 4B shows the routing table of switch device B after VM 1 has migrated from server A to server B. The routing table of switch device B stores the MAC addresses of VM 1 and VM 4. However, there is no MAC-to-IP binding information for VM 1 and VM 4, perhaps since VM 1 and VM 4 have not initiated a communication with other virtual machines in the network 100. If VM 1 sends the packet 114 to switch device B, destined for VM 4, switch device B can utilize the techniques described above to obtain the MAC-to-IP binding information for VM 1 and VM 4. Additionally, the routing table of switch device B stores the MAC addresses of VM 2 and VM N and has the MAC-to-IP binding information for VM 2 and VM N. This MAC-to-IP binding information for VM 2 and VM N may have been obtained, for example, from a routing table update (as described above) sent by switch device A to switch device B after switch device A determined the IP addresses of VM 2 and VM N.

Figure 5:
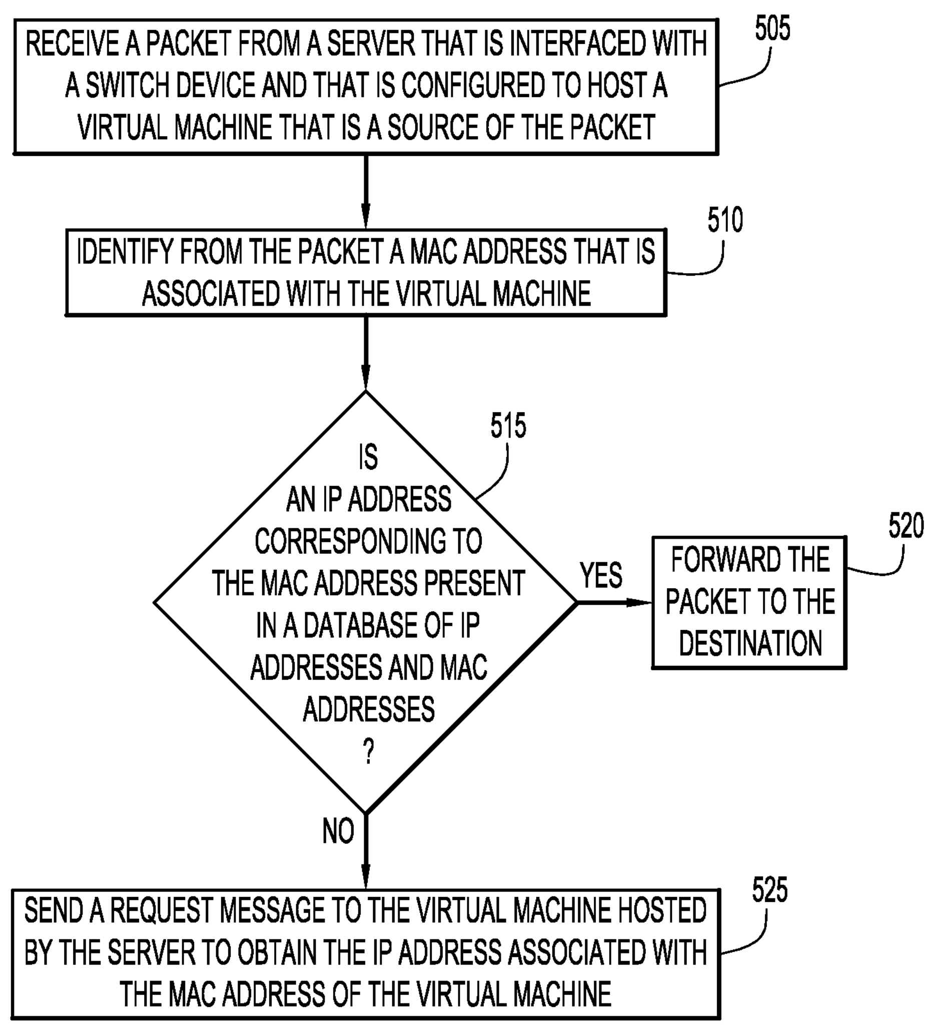
FIG. 5 shows an example flow chart depicting operations performed by the switch device to determine the identity of the virtual machine by sending request messages to the server hosting the virtual machine.

Reference is now made to FIG. 5. FIG. 5 shows an example flow chart 500 depicting operations performed by switch device B to determine the IP address of a virtual machine by sending an ARP request message in response to receiving a packet with an unknown source IP address. At operation 505, a packet is received from a server (e.g., server B) that is interfaced with a switch device (e.g., switch device B) and that is configured to host a virtual machine (e.g., VM 1) that is a source of the packet. At operation 510, a MAC address that is associated with the virtual machine is identified from the packet, and at operation 515, a determination is made as to whether an IP address corresponding to the MAC address is present in a database of IP addresses and MAC addresses. If there is an IP address corresponding to the MAC address, the packet is forwarded, at operation 520, to the destination network device. If there is not an IP address corresponding to the MAC address (i.e., the answer to decision 515 is "no"), a request message (e.g., an ARP request message) is sent to the virtual machine by the server to obtain the IP address associated with the MAC address of the virtual machine.

Reference is now made to FIG. 6. FIG. 6 shows an example flow chart 600 depicting operations performed by switch device B to determine the IP address of a virtual machine in response to an RPF check performed by the switch device. At operation 605, a packet is received from a server (e.g., server B) that is interfaced with a switch device (e.g., switch device B) and that is configured to host a virtual machine (e.g., VM 1) that is a source of the packet. At operation 610, a source IP address associated with the virtual machine is identified and a destination IP address associated with a destination network device is identified. At operation 615, a determination is made as to whether the source IP address is present in a database of IP addresses of the switch device. If the source IP address is present (i.e., if the source IP address is known to the switch device), the packet is forwarded to the destination at operation 620. If the source IP address is not present (i.e., if the source IP address is unknown to the switch device), then a determination is made, at operation 625, as to whether the packet was received by the switch device via an authorized interface. If the packet was received via an authorized interface, at operation 630, an RPF check has a "passed" status, and at operation 635, the packet is forwarded to the destination. Additionally, at operation 640, the packet is leaked to a software component of the switch device, and at operation 645, a request message (e.g., an ARP request message) is sent to the server to obtain the source IP address associated with a source MAC address known to the switch device and associated with the virtual machine. If the packet was not received via an authorized interface (i.e., the answer to decision 625 is "no"), the RPF check status, at operation 650, has a "failed" status. In one example, when the switch device B is capable of leaking packets to a CPU of the switch device B, the RPF check failure is not presented to the software component of the switch device B. In another example, when the switch device B does not leak packets to the CPU of the switch device B, the switch device B responds as if there is a traditional RPF check failure without performing any leaking to the software component of the switch device B.

It should be appreciated that the techniques described above in connection with all embodiments may be performed by one or more computer readable storage media that is encoded with software comprising computer executable instructions to perform the methods and steps described herein. For example, the operations performed by switch device A and switch device B may be performed by one or more computer or machine readable storage media (non-transitory) or device executed by a processor and comprising software, hardware or a combination of software and hardware to perform the techniques described herein.

In summary, a method is provided comprising: at a switch device, receiving a packet from a server that is interfaced with the switch device and that is configured to host a virtual machine that is a source of the packet; identifying from the packet a Media Access Control (MAC) address that is associated with the virtual machine; in response to the identifying, determining whether an Internet Protocol (IP) address corresponding to the MAC address of the virtual machine is present in a database of IP addresses and MAC addresses accessible by the switch device; and if the determining indicates that the IP address corresponding to the MAC address is not present in the database, sending a request message to the virtual machine hosted by the server to obtain the IP address associated with the MAC address of the virtual machine.

In addition, a method is provided comprising: at a switch device, receiving a packet from a server that is interfaced with the switch device and that is configured to host a virtual machine that is a source of the packet; identifying from the packet a source Internet Protocol (IP) address associated with the virtual machine and a destination IP address associated with a destination network device; determining that the source IP address is not present in a database of IP addresses of the switch device; evaluating the database to determine whether or not the packet was received by the switch device via an authorized interface; and when the evaluating indicates that the packet was received by the switch device along an authorized interface, sending a request message to the server to obtain the source IP address associated with a source Media Access Control (MAC) address known to the switch device and associated with the virtual machine.

Furthermore, an apparatus is provided comprising: a network interface unit; a memory; and a processor coupled to the network interface unit and the memory and configured to: receive a packet from a server that is interfaced with the switch device and that is configured to host a virtual machine that is a source of the packet; identify from the packet a Media Access Control (MAC) address that is associated with the virtual machine that operates as a source of the packet; determine whether an Internet Protocol (IP) address corresponding to the MAC address of the virtual machine is present in a database of IP addresses and MAC addresses accessible by the switch device; and send a request message to the virtual machine hosted by the server to obtain the IP address associated with the MAC address of the virtual machine if the determination indicates that the IP address corresponding to the MAC address is not present in the database.

Additionally, an apparatus is provided comprising: a network interface unit; a memory; and a processor coupled to the network interface unit and the memory and configured to: receive a packet from a server that is interfaced with the switch device and that is configured to host a virtual machine that is a source of the packet; identify from the packet a source Internet Protocol (IP) address associated with the virtual machine and a destination IP address associated with a destination network device; determine that the source IP address is not present in a database of IP addresses of the switch device; evaluate the database to determine whether or not the packet was received by the switch device via an authorized interface; and send a request message to the server when the packet was received by the switch device along an authorized interface to obtain the source IP address associated with a source Media Access Control (MAC) address known to the switch device and associated with the virtual machine.

The above description is intended by way of example only. Various modifications and structural changes may be made therein without departing from the scope of the concepts described herein and within the scope and range of equivalents of the claims.

What is claimed is:

1. A method comprising:

at a switch device, receiving a packet from a server that is interfaced with the switch device and that is configured to host a virtual machine that is a source of the packet, wherein the virtual machine has been migrated from a different server;

identifying from the packet a Media Access Control (MAC) address that is associated with the virtual machine;

in response to the identifying, determining whether an Internet Protocol (IP) address corresponding to the MAC address of the virtual machine is present in a database of IP addresses and MAC addresses accessible by the switch device; and if the determining indicates that the IP address corresponding to the MAC address is not present in the database on the switch device, sending a request message from the switch device to the virtual machine hosted by the server that is interfaced to the switch device to obtain the IP address associated with the MAC address of the virtual machine.

2. The method of claim 1, further comprising:

receiving a response message from the virtual machine in response to the request message, wherein the response message comprises the IP address associated with the MAC address of the virtual machine; and updating the database of IP addresses and MAC addresses to indicate an association of the IP address with the MAC address of the virtual machine.

3. The method of claim 2, wherein updating comprises updating a routing table of the switch device.

4. The method of claim 2, wherein sending the request message comprises sending an Address Resolution Protocol (ARP) request message and wherein receiving the response message comprises receiving an ARP response message.

5. The method of claim 1, wherein sending comprises sending the request message to the server via a port on which the packet was received by the switch device.

6. A method comprising:

at a switch device, receiving a packet from a server that is interfaced with the switch device and that is configured to host a virtual machine that is a source of the packet, wherein the virtual machine has been migrated from a different server;

identifying from the packet a source Internet Protocol (IP) address associated with the virtual machine and a destination IP address associated with a destination network device;

determining that the source IP address associated with the virtual machine is not present in a database of IP addresses of the switch device;

evaluating the database to determine whether or not the packet was received by the switch device via an authorized interface; and when the evaluating indicates that the packet was received by the switch device along the authorized interface, sending a request message along the authorized interface to the server to obtain the source IP address associated with a source Media Access Control (MAC) address known, from the packet, to the switch device and associated with the virtual machine.

7. The method of claim 6, further comprising:

receiving a response message in response to the sending the request message, wherein the response message indicates that the source IP address is associated with the source MAC address; and updating the database of IP addresses to indicate an association of the source IP address with the source MAC address.

8. The method of claim 7, wherein updating comprises updating a routing table of the switch device.

9. The method of claim 7, wherein sending the request message comprises sending an Address Resolution Protocol (ARP) request message and wherein receiving the response message comprises receiving an ARP response message.

10. The method of claim 6, further comprising:

when the evaluating indicates that the packet was received by the switch device via the authorized interface:

setting a reverse path forwarding (RPF) check status of the packet as having a passing status;

leaking the packet to a software component of the switch device; and forwarding the packet to the destination network device from the software component.

11. The method of claim 10, further comprising periodically leaking the packet to the software component of the switch device.

12. The method of claim 10, wherein sending the request message comprises sending the request message in response to leaking the packet to the software component of the switch device.

13. The method of claim 6, further comprising:

setting a reverse path forwarding (RPF) check status of the packet as having a failing status; and redirecting the packet to the server hosting the virtual machine with the request message to obtain the source IP address.

14. The method of claim 6, wherein evaluating comprises evaluating the database to determine whether or not the packet was received by the switch device within an authorized subnet of interfaces.

15. An apparatus comprising:

a network interface unit;

a memory; and a processor coupled to the network interface unit and the memory and configured to:

receive a packet from a server that is interfaced with the apparatus and that is configured to host a virtual machine that is a source of the packet, wherein the virtual machine has been migrated from a different server;

identify from the packet a Media Access Control (MAC) address that is associated with the virtual machine that operates as a source of the packet;

determine whether an Internet Protocol (IP) address corresponding to the MAC address of the virtual machine is present in a database of IP addresses and MAC addresses accessible by the apparatus; and send a request message from the apparatus to the virtual machine hosted by the server that is interfaced to the apparatus to obtain the IP address associated with the MAC address of the virtual machine if the determination indicates that the IP address corresponding to the MAC address is not present in the database accessible by the apparatus.

16. The apparatus of claim 15, wherein the processor is further configured to:

receive a response message from the virtual machine in response to the request message, wherein the response message comprises the IP address associated with the MAC address of the virtual machine; and update the database of IP addresses and MAC addresses to indicate an association of the IP address with the MAC address of the virtual machine.

17. The apparatus of claim 16, wherein the processor is further configured to send an Address Resolution Protocol (ARP) request message as the request message and receive an ARP response message as the response message.

18. An apparatus comprising:

a network interface unit;

a memory; and a processor coupled to the network interface unit and the memory and configured to:

receive a packet from a server that is interfaced with the apparatus and that is configured to host a virtual machine that is a source of the packet, wherein the virtual machine has been migrated from a different server;

identify from the packet a source Internet Protocol (IP) address associated with the virtual machine and a destination IP address associated with a destination network device;

determine that the source IP address associated with the virtual machine is not present in a database of IP addresses of the apparatus;

evaluate the database to determine whether or not the packet was received by the apparatus via an authorized interface; and send a request message to the server along the authorized interface when the packet was received by the apparatus along the authorized interface to obtain the source IP address associated with a source Media Access Control (MAC) address known to the apparatus, from the packet, and associated with the virtual machine.

19. The apparatus of claim 18, wherein the processor is further configured to:

receive a response message in response to sending the request message, wherein the response message indicates that the source IP address is associated with the source MAC address; and update the database of IP addresses to indicate an association of the source IP address with the source MAC address.

20. The apparatus of claim 19, wherein the processor is further configured to send an Address Resolution Protocol (ARP) request message as the request message and to receive an ARP response message as the response message.

21. The apparatus of claim 18, wherein the processor is further configured to:

set a reverse path forwarding (RPF) check status of the packet as having a passing status when the packet was received by the apparatus via the authorized interface;

leak the packet to a software component of the apparatus; and forward the packet to the destination network device from the software component.

22. The apparatus of claim 18, wherein the processor is further configured to:

set a reverse path forwarding (RPF) check status of the packet as having a failing status; and redirect the packet to the server hosting the virtual machine with the request message to obtain the source IP address.

* * * * *